(12) United States Patent
Bembnowicz

(10) Patent No.: US 12,535,442 B2
(45) Date of Patent: Jan. 27, 2026

(54) METHODS AND DEVICES FOR LIQUID IMPEDANCE MEASUREMENT USING A FOUR-ELECTRODE DEVICE

(71) Applicant: Stichting IMEC Nederland, Eindhoven (NL)

(72) Inventor: Pawel Bembnowicz, Waalre (NL)

(73) Assignee: Stichting IMEC Nederland, Eindhoven (NL)

( * ) Notice: Subject to any disclaimer, the term of this patent is extended or adjusted under 35 U.S.C. 154(b) by 369 days.

(21) Appl. No.: 18/240,497

(22) Filed: Aug. 31, 2023

(65) Prior Publication Data

US 2024/0077441 A1 Mar. 7, 2024

(30) Foreign Application Priority Data

Sep. 5, 2022 (EP) ..................................... 22193936

(51) Int. Cl.
*G01N 27/02* (2006.01)
*G01N 27/06* (2006.01)

(52) U.S. Cl.
CPC ............. *G01N 27/02* (2013.01); *G01N 27/06* (2013.01)

(58) Field of Classification Search
CPC ......... G01N 27/06; G01N 27/07; G01N 27/02
See application file for complete search history.

(56) References Cited

U.S. PATENT DOCUMENTS

| | | | | |
|---|---|---|---|---|
| 4,118,663 | A * | 10/1978 | Barben, II | G01R 27/22 324/443 |
| 4,808,931 | A | 2/1989 | Ling | |
| 7,135,876 | B2 * | 11/2006 | Petersen | G01Q 60/30 324/754.1 |
| 11,415,612 | B2 * | 8/2022 | Castiglione | G01R 27/2617 |
| 2011/0208458 | A1 * | 8/2011 | Pinter | A61B 5/053 702/65 |
| 2012/0145561 | A1 | 6/2012 | Coulon et al. | |

(Continued)

OTHER PUBLICATIONS

Analog Devices, AN-1302 Application Note, Optimizing the ADuCM350 for 4-Wire, Bioisolated Impedance Measurement Applications.

(Continued)

*Primary Examiner* — Herbert K Roberts
(74) *Attorney, Agent, or Firm* — MOSER TABOADA

(57) ABSTRACT

Provided is a method for liquid impedance measurement using a four-electrode device comprising an electrode structure. The method (100) comprises applying a sinusoidal voltage signal across a first outer electrode and a second outer electrode of said electrode structure and performing current and voltage measurements thereof. The method further comprises applying said sinusoidal voltage signal across a reference impedance and performing current and voltage measurements thereof. The method further comprises calculating an outer impedance between said first outer electrode and said second outer electrode based on a subset of the measurements. The method further comprises calculating an inner impedance between said first inner electrode and said second inner electrode a subset of the measurements, wherein the inner impedance represents the liquid impedance. A four-electrode device for performing the method is also provided.

16 Claims, 2 Drawing Sheets

(56) References Cited

U.S. PATENT DOCUMENTS

| | | | | |
|---|---|---|---|---|
| 2012/0245873 | A1* | 9/2012 | Donnangelo | G01N 27/02 |
| | | | | 324/201 |
| 2015/0212024 | A1* | 7/2015 | Banks | G01N 27/30 |
| | | | | 73/61.61 |
| 2017/0100052 | A1* | 4/2017 | Jung | A61B 5/086 |
| 2017/0160069 | A1* | 6/2017 | Folgero | G01B 15/02 |
| 2020/0268274 | A1* | 8/2020 | Saliga | A61B 5/0537 |
| 2021/0003523 | A1* | 1/2021 | Chandak | G01N 27/028 |
| 2021/0325328 | A1* | 10/2021 | Ano | A61B 5/053 |
| 2022/0162540 | A1* | 5/2022 | Kashanin | C12M 41/00 |

OTHER PUBLICATIONS

Analog Devices, ADuCM355 Hardware Reference Manual UG-1262.
Nazer, et al., "Classical EIS and square pattern signals comparison based on a well-known reference impedance"; World Electric Vehicle Journal vol. 6.
Heaney, "Electrical Conductivity and Resistivity", Downloaded from Academia.edu.
European Extended Search Report for Application No. 22193936.6-1001 mailed Jun. 2, 2023.

* cited by examiner

METHODS AND DEVICES FOR LIQUID IMPEDANCE MEASUREMENT USING A FOUR-ELECTRODE DEVICE

CROSS-REFERENCE TO RELATED APPLICATIONS

The present application claims the benefit of and priority to EP Patent Application Serial No. 22193936.6, filed Sep. 5, 2022, the entire contents of which is incorporated herein by reference.

TECHNICAL FIELD

The present inventive concept relates to a method and a device for measuring a liquid impedance using a four-electrode device.

BACKGROUND

The impedance of a liquid, e.g., water, may provide information of its pollution, salinity, or the like, since dissolved salt or other types of ions typically affect the electrical properties of water. Measuring the electrical conductivity of water typically involves measuring the impedance between a pair of electrodes exposed to the water, where the impedance is proportional to the inverse of the electrical conductivity. Impedance measurement techniques using two or four electrodes are known in the prior art. However, such techniques suitable for use in field conditions suffer from low accuracy, while accurate impedance measurements of a liquid using such techniques normally require laboratory conditions. Hence, there is a need for an improved approach for two- or four-electrode liquid impedance measurements in field conditions.

SUMMARY

An objective of the present inventive concept is to provide an improved approach for liquid impedance measurements in field conditions.

According to a first aspect, there is provided method for liquid impedance measurement using a four-electrode device comprising an electrode structure. The method comprises applying a sinusoidal voltage signal across a first outer electrode and a second outer electrode of said electrode structure and performing a first set of measurements comprising measuring a value proportional to a current through said first outer electrode and said second outer electrode, measuring a value proportional to a voltage drop across said first outer electrode and said second outer electrode, and measuring a value proportional to a voltage drop across a first inner electrode and a second inner electrode of said electrode structure. The method further comprises applying said sinusoidal voltage signal across a reference impedance and performing a second set of measurements comprising measuring a value proportional to a current through said reference impedance and measuring a value proportional to a voltage drop across said reference impedance. The method further comprises calculating an outer impedance between said first outer electrode and said second outer electrode based on said reference impedance, said value proportional to said current through said first outer electrode and said second outer electrode, said value proportional to said voltage drop across said first outer electrode and said second outer electrode, said value proportional to said current through said reference impedance, and said value proportional to said voltage drop across said reference impedance. The method further comprises calculating an inner impedance between said first inner electrode and said second inner electrode based on the calculated outer impedance, said value proportional to said voltage drop across said first outer electrode and said second outer electrode, and said value proportional to said voltage drop across said first inner electrode and said second inner electrode.

The electrode structure may be submerged in the liquid for impedance measurement of the liquid. Thus, as a result, the sinusoidal voltage signal may be applied across the liquid present between the first outer electrode and the second outer electrode, the current through the first outer electrode and the second outer electrode may be a current through the liquid present between the first outer electrode and the second outer electrode, the voltage drop between the first outer electrode and the second outer electrode may be a voltage drop through the liquid present between the first outer electrode and the second outer electrode, the outer impedance may be an impedance of the liquid present between the first outer electrode and the second outer electrode, and the inner impedance may be an impedance of the liquid present between the first inner electrode and the second inner electrode. The method may facilitate measuring the impedance of a liquid accurately should the liquid to be measured on be associated with a relatively low impedance, i.e., even if the measured impedance of the liquid is of comparable magnitude as an internal impedance of the four-electrode device. Such an internal impedance may be undesirably present upon application and/or amplification of the sinusoidal voltage signal, and thereby distort measured quantities, since, e.g., a significant voltage drop may be present over the internal impedance upon impedance measurements on low-impedance liquids. The method may, by the above-mentioned measurement steps across the four-electrode structure and the reference impedance, account for this internal impedance, thereby providing an increased liquid impedance measurement accuracy for four-electrode devices. The method may thereby be suitable in the event the liquid be water to be measured upon determining its qualities as drinking water. Such water may contain ions, salt, etc., which may significantly increase the electrical conductivity of the water, thereby reducing the measured impedance. Consequently, the method may facilitate to accurately determining a water quality based on its impedance. The four-electrode device may further be suitable for use in field conditions with minimal maintenance and electrical power, in contrast to conventional accurate liquid impedance methods normally requiring a more clinical environment for accurate liquid impedance measurements.

The first and the second outer electrodes are responsible for current injection and the remaining electrodes, i.e., the first and the second inner electrodes are configured for measuring a voltage therebetween. In practice, there is a limited amount of electrochemical reaction, such as electroplating, corrosion, etc., present on the inner electrodes due to the small current flowing through these electrodes. Such electrochemical reactions may affect the effective measuring area of the electrode. Hence, the presented method may facilitate reduction of such electrochemical reaction, thereby providing higher accuracy of the measured voltage, and thus the impedance, between the inner electrodes. Further, the four-electrode structure may reduce influence of electrode-electrolyte phenomena.

Throughout this disclosure, calculations of, e.g., the outer impedance and the inner impedance may be disclosed using equations. Naturally, the corresponding calculation may be carried out using the respective equation. However, as the skilled person readily would recognize, such a calculation may be carried out in several different mathematically equivalent ways, e.g., in different order, or similar. The corresponding calculation being described as being "representable" through the respective equation should be understood as covering such mathematically equivalent operations.

According to an embodiment, the processor or circuitry is configured to calculate said outer impedance as representable by $$Z_T = Z_r \frac{\sim I_r \sim V_o}{\sim V_r \sim I_s}$$

and calculate said inner impedance as representable by $$Z_i = Z_T \frac{\sim V_i}{\sim V_o}$$

wherein $Z_T$ is said outer impedance, $Z_i$ is said inner impedance, $Z_r$ is said reference impedance, $\sim I_r$ is said value proportional to said current through said reference impedance, $\sim V_o$ is said value proportional to said voltage drop across said first outer electrode and said second outer electrode, $\sim V_r$ is said value proportional to said voltage drop across said reference impedance, $\sim I_s$ is said value proportional to said current through said first outer electrode and said second outer electrode, and $\sim V_i$ is said value proportional to said voltage drop across said first inner electrode and said second inner electrode of said electrode structure.

Hence, a straight-forward calculation of the inner impedance is facilitated, which may reduce power consumption of the four-electrode device thereby facilitate its qualities to be used in field conditions.

The tilde character, $\sim$, preceding some of the above and below quantities denotes "being proportional to". Hence, $\sim X$ is to be understood as a value proportional to X, i.e., X multiplied by a proportionality constant.

According to an embodiment, each said applying of said sinusoidal voltage signal comprises applying said sinusoidal voltage signal by a digital-to-analog converter, DAC.

A DAC may provide a sinusoidal voltage signal having a well-defined amplitude, frequency, and phase, thereby facilitating accuracy of the measured/calculated impedance of the liquid. The sinusoidal voltage signal may be amplified by a power buffer (further discussed below) in which an internal impedance may be present, which internal impedance the method accounts for when determining the impedance of the liquid.

According to an embodiment, each said measuring comprises a conversion by an analog-to-digital converter, ADC. The ADC may facilitate further analysis of measured data.

According to an embodiment, each said measuring comprises recording a time series.

Preferably, each time series comprises or more periods of data to form a (truncated) sinusoidal function for further analysis, which may facilitate accuracy of the method.

According to an embodiment, each said measuring further comprises applying a discrete Fourier transform, DFT, to the recorded time series.

DFT may facilitate a computationally efficient approach to further analyze the recorded (sinusoidal) time series.

According to an embodiment, said applying of said discrete Fourier transform comprises converting each recorded time series to a corresponding frequency spectrum and said measuring further comprises determining a dominating frequency bin of said frequency spectrum, and determining the measured value from said dominating frequency bin. This is a particularly efficient way of removing noise or other artefacts in the recorded time series.

According to a second aspect, there is provided a four-electrode device for liquid impedance measurement. The four-electrode device comprises an electrode structure comprising a first outer electrode, a second outer electrode, a first inner electrode, and a second inner electrode. The four-electrode device further comprises a reference impedance and a signal generator configured to generate a sinusoidal voltage signal, wherein said four-electrode device is configured to measure a value proportional to a current through said first outer electrode and said second outer electrode, a value proportional to a voltage drop across said first outer electrode and said second outer electrode, a value proportional to a voltage drop across a first inner electrode and a second inner electrode of said electrode structure, a value proportional to a current through said reference impedance, and a value proportional to a voltage drop across said reference impedance. The four-electrode device further comprises a processor or circuitry configured to calculate an outer impedance between said first outer electrode and said second outer electrode based on said reference impedance, said value proportional to said current through said first outer electrode and said second outer electrode, said value proportional to said voltage drop across said first outer electrode and said second outer electrode, said value proportional to said current through said reference impedance, and said value proportional to said voltage drop across said reference impedance. The four-electrode device further comprises an inner impedance between said first inner electrode and said second inner electrode based on the calculated outer impedance, said value proportional to said voltage drop across said first outer electrode and said second outer electrode, and said value proportional to said voltage drop across said first inner electrode and said second inner electrode.

This aspect may generally present the same or corresponding advantages as the former aspect. The above-mentioned features in connection with the first aspect, when applicable, apply to this second aspect as well.

According to an embodiment, said processor or circuitry is configured to calculate said outer impedance as representable by $$Z_T = Z_r \frac{\sim I_r \sim V_o}{\sim V_r \sim I_s}$$

and calculate said inner impedance as representable by $$Z_i = Z_T \frac{\sim V_i}{\sim V_o}$$

wherein $Z_T$ is said outer impedance, $Z_i$ is said inner impedance, $Z_r$ is said reference impedance, $\sim I_r$ is said value proportional to said current through said reference impedance, ~$V_o$ is said value proportional to said voltage drop across said first outer electrode and said second outer electrode, ~$V_r$ is said value proportional to said voltage drop across said reference impedance, ~$I_s$ is said value proportional to said current through said first outer electrode and said second outer electrode, and ~$V_i$ is said value proportional to said voltage drop across a first inner electrode and a second inner electrode of said electrode structure.

According to an embodiment, the four-electrode device further comprises a first switch and a second switch configured to, upon said sinusoidal voltage signal being generated, switch a path, through which said sinusoidal voltage signal is traversable, between across said electrode structure and across said reference impedance. The first switch and the second switch may thereby be arranged such that when the sinusoidal voltage signal traverses across the electrode structure, the reference impedance is electrically decoupled from the electrode structure, and vice versa. This is a particularly power efficient way of measuring electrical properties across different components using a single voltage source.

According to an embodiment, the signal generator comprises a digital-to-analog converter, DAC.

According to an embodiment, the four-electrode device further comprises a first analog-to-digital converter, ADC, configured to measure said value proportional to said voltage drop across said first outer electrode and said second outer electrode, and said value proportional to said voltage drop across said reference impedance, a second ADC configured to measure said value proportional to said voltage drop across said first inner electrode and said second inner electrode, and a third ADC configured to measure said value proportional to said current through said first outer electrode and said second outer electrode, and said value proportional to said current through said reference impedance.

According to an embodiment, the four-electrode device further comprises a third switch and a fourth switch arranged to selectively connect said first ADC. The third switch and the fourth switch may be of so-called on-off type. Hence, when these switches are set in an off mode, the first ADC is electrically decoupled from the remaining circuitry of the four-electrode device. When the switches are set in an on mode, data regarding voltage drops across the outer electrodes or across the reference impedance may be acquired and recorded.

According to an embodiment, the processor or circuitry is further configured to record a time series pertaining to each of said value proportional to said voltage drop across said first outer electrode and the second outer electrode, said value proportional to said voltage drop across said reference impedance, said value proportional to said voltage drop across said first inner electrode and said second inner electrode, said value proportional to said current through said first outer electrode and said second outer electrode, and said value proportional to said current through said reference impedance.

According to an embodiment, the processor or circuitry is further configured to apply a discrete Fourier transform, DFT, to each recorded time series.

BRIEF DESCRIPTION OF THE DRAWINGS

The above, as well as additional objects, features, and advantages of the present inventive concept, will be better understood through the following illustrative and non-limiting detailed description, with reference to the appended drawings. In the drawings like reference numerals will be used for like elements unless stated otherwise.

DETAILED DESCRIPTION

Figure 1:
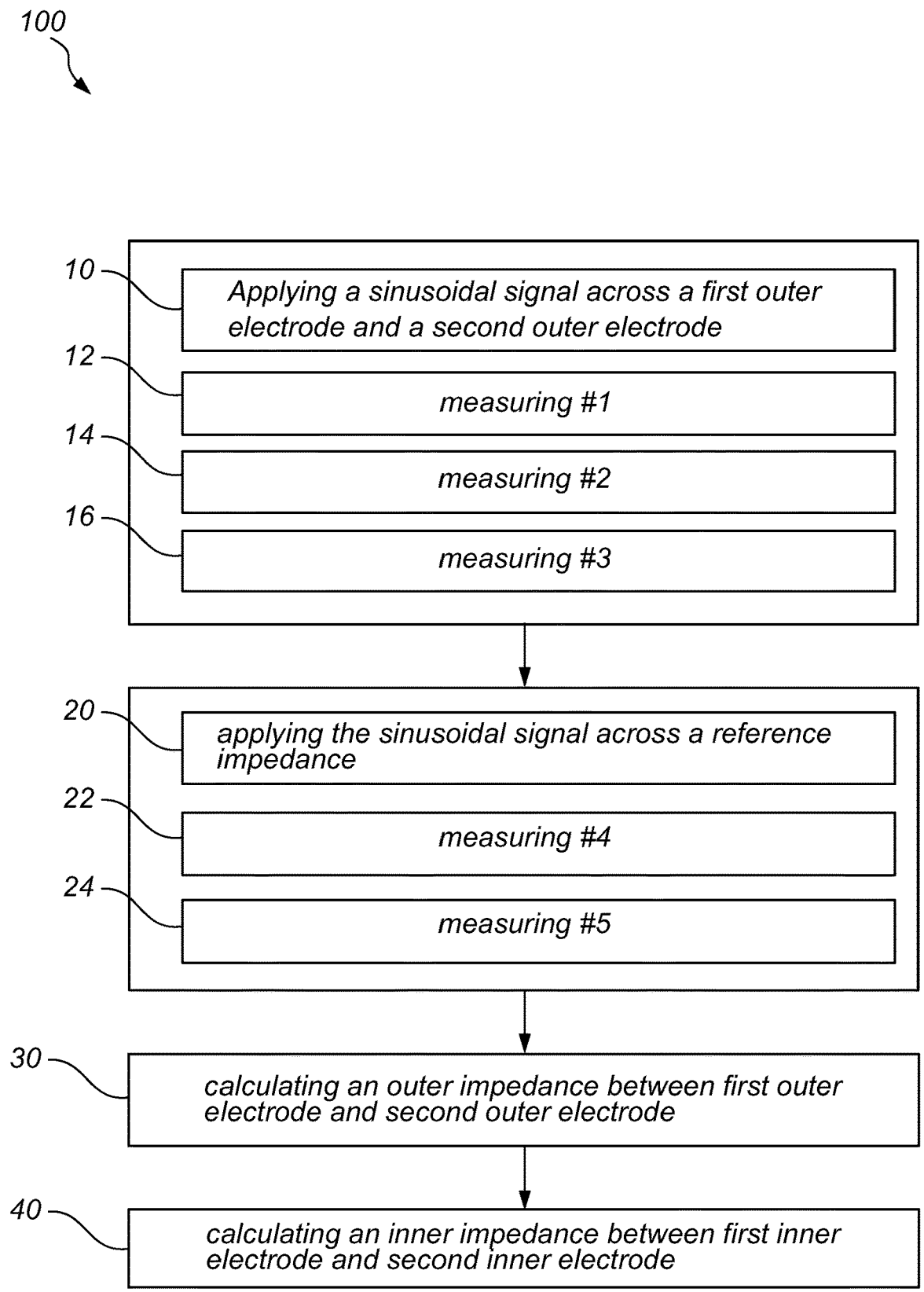
FIG. 1 shows a flowchart of a method for liquid impedance measurement using a four-electrode device comprising an electrode structure.
Figure 2A:
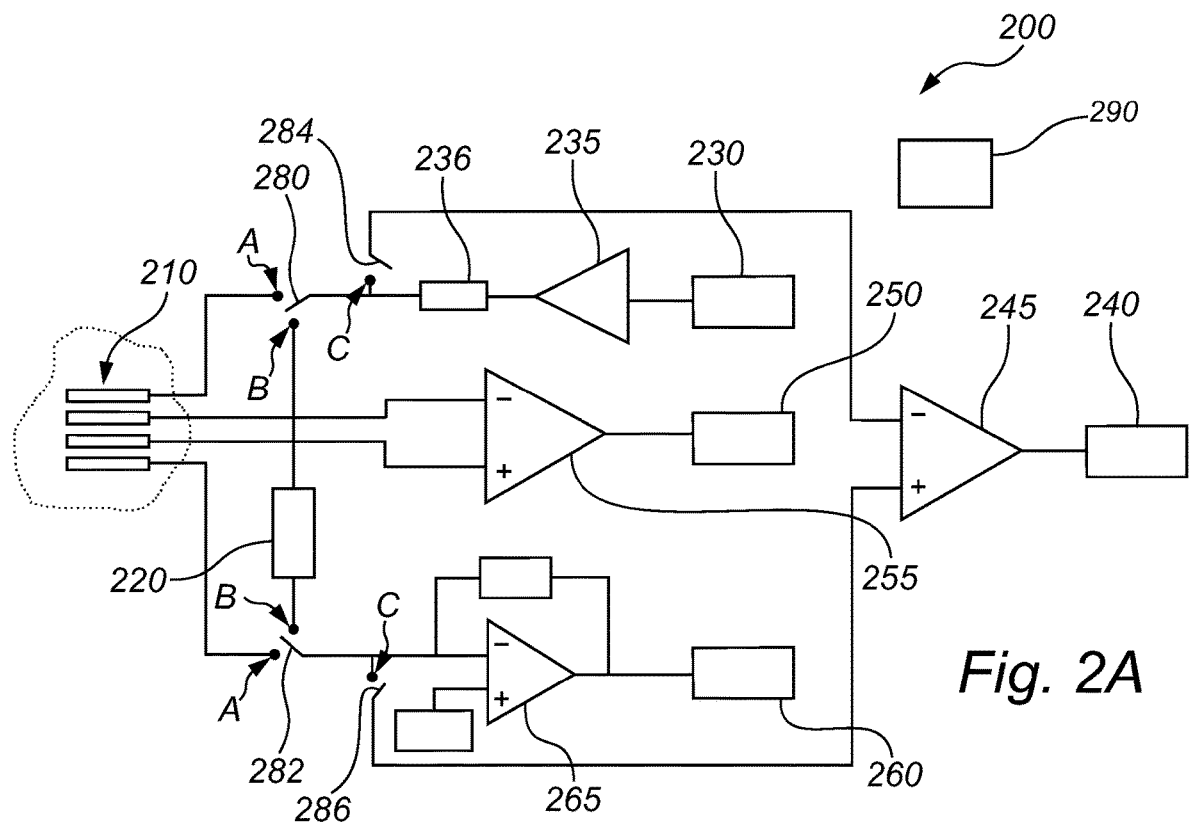
FIG. 2A schematically shows a four-electrode device for liquid impedance measurement.
Figure 2B:
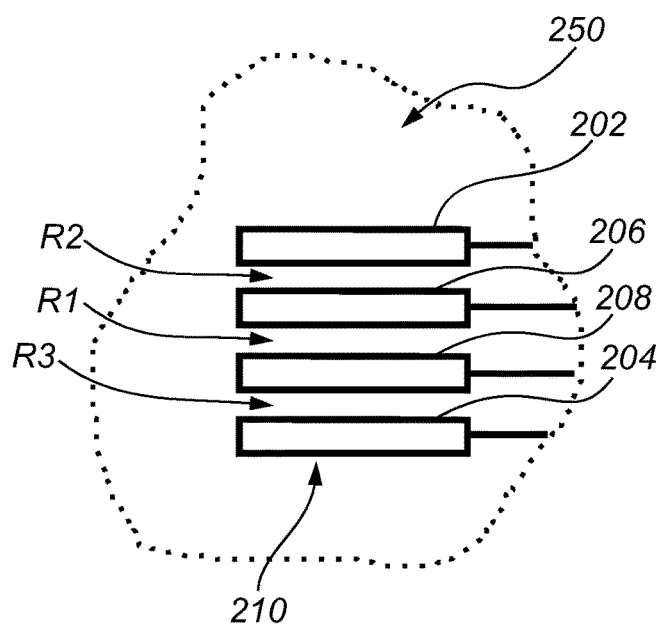
FIG. 2B schematically shows an electrode structure of the four-electrode device.

FIG. 1 shows a flowchart of a method 100 for liquid impedance measurement using a four-electrode device comprising an electrode structure 210. FIGS. 2A and 2B, showing the four-electrode device, may advantageously be viewed in connection with the below description of FIG. 1.

As part of the method, the four-electrode device, or at least the electrode structure may be submerged into the liquid the impedance of which is to be measured.

The method 100 comprises applying 10 a sinusoidal voltage signal across a first outer electrode 202 and a second outer electrode 204 of said electrode structure 210 and performing a first set of measurements 12, 14, 16. The sinusoidal voltage signal allows measurements across electrical components as set out below. The first set of measurements 12, 14, 16 comprises measuring 12 a value proportional to a current through said first outer electrode 202 and said second outer electrode 204, measuring 14 a value proportional to a voltage drop across said first outer electrode 202 and said second outer electrode 204, and measuring 16 a value proportional to a voltage drop across a first inner electrode 206 and a second inner electrode 208 of said electrode structure 210.

The method 100 further comprises applying 20 said sinusoidal voltage signal across a reference impedance 220 and performing a second set of measurements 22, 24. The performing a second set of measurements 22, 24 comprises measuring 22 a value proportional to a current through said reference impedance and measuring 24 a value proportional to a voltage drop across said reference impedance.

The reference impedance 220 may be any suitable component having a known impedance, possibly dependent on a voltage applied across it. By way of example, the reference impedance 220 may be an ordinary resistor having a known resistance. Alternatively, the reference impedance 220 may be a capacitor or an inductor or a combination thereof.

The method 100 further comprises calculating 30 an outer impedance between said first outer electrode and said second outer electrode based on said reference impedance 220, said value proportional to said current through said first outer electrode 202 and said second outer electrode 204, said value proportional to said voltage drop across said first outer electrode 202 and said second outer electrode 204, said value proportional to said current through said reference impedance 220, and said value proportional to said voltage drop across said reference impedance 220.

The method 100 further comprises calculating 40 an inner impedance between said first inner electrode 206 and said second inner electrode 208 based on the calculated outer impedance, said value proportional to said voltage drop across said first outer electrode 202 and said second outer electrode 204, and said value proportional to said voltage drop across said first inner electrode 206 and said second inner electrode 208. Hence, there method may include five different measurements 12, 14, 16, 22, 24, which may be time series measurements, used to determine the impedance between the first and the second inner electrodes 206, 208, i.e., determine the impedance of the liquid being present between the first 206 and the second 208 electrode.

The measured impedance between the first 206 and the second 208 inner electrode indicates the number of electric carriers (ions) dissolved in the water. However, water may itself generate ions is the applied voltage is relatively high. Thus, the impedance of aqueous solutions is in general not linear, and above a certain potential threshold water may dissociate and produce additional current carriers. Hence, it is desirable to control the applied voltage (between the outer electrodes 202, 204) to prevent uncontrolled reactions.

The calculation 30 of the outer impedance may be representable as:

$$Z_T = Z_r \frac{\sim I_r \sim V_o}{\sim V_r \sim I_s}$$

and the calculation 40 of said inner impedance may be representable as:

$$Z_i = Z_T \frac{\sim V_i}{\sim V_o}$$

wherein $Z_T$ is said outer impedance, $Z_i$ is said inner impedance, $Z_r$ is said reference impedance 220, $\sim I_r$ is said value proportional to said current through said reference impedance 220, $\sim V_o$ is said value proportional to said voltage drop across said first outer electrode 202 and said second outer electrode 204, $\sim V_r$ is said value proportional to said voltage drop across said reference impedance 220, $\sim I_s$ is said value proportional to said current through said first outer electrode 202 and said second outer electrode 204, and is said value proportional to said voltage drop across said first inner electrode 206 and said second inner electrode 208 of said electrode structure 210.

As noted above, the tilde character, ~, preceding some of the above and below quantities denotes "being proportional to". Hence, ~X is to be understood as a value proportional to X, i.e., X multiplied by a proportionality constant. Further, different quantities may be associated with different such proportionality constants.

The respective proportionality constant may be adjusted as needed for the respective calculation, as generally known by the skilled person.

In particular, as an example $\sim V_i$ and $\sim V_o$ may be measured using different differential amplifiers. Hence different gains may be associated with these two quantities. Thus, before applying the above formula for $Z_i$ gains for the respective differential amplifier, as known, or, e.g., as measured during a calibration procedure, may be equalized between the two quantities, i.e., so that the two quantities in the ratio have the same proportionality constant. The above may equally apply to other quantities discussed herein, such that relevant quantities in a specific ratio (e.g., the ratios included in the formulae for calculating $Z_i$ and/or $Z_T$) have similar proportionality constants. Differing proportionality constants in a specific ratio may be equalized for before or after calculating the value of the specific ratio, as readily appreciated by the skilled person.

The applying 10, 20 the sinusoidal voltage signal may comprise applying the sinusoidal voltage signal by a digital-to-analog converter, DAC 230. The sinusoidal voltage signal may be amplified by a power buffer 235. The power buffer is associated with an internal impedance 236. This internal impedance 236 is undesirably caused by electrical components present in the power buffer 235, schematically shown externally to the power buffer 235 in FIG. 2 as a box 236. The internal impedance 236 can cause significant impedance measurement distortions across the electrode structure 210 or the reference impedance 220 and may result in an inaccurate impedance measurement. This is especially true for impedance measurements on a relatively highly electrically conducting liquid, such as water associated with high salinity, or water contaminated by other types of ions. This since a significant voltage drop may then occur over the internal impedance 236, resulting in an erroneous voltage drop across other involved electrical components. The method 100 may reduce or substantially eliminate such inaccurate impedance measurements by, e.g., performing the above-mentioned measurements across the reference impedance 220.

Each measurement 12, 14, 16, 22, 24 may comprise a conversion by an analog-to-digital converter, ADC 240, 250, 260. A first ADC 240 may be configured to measure $\sim V_o$ and $\sim V_r$. A second ADC 250 may be configured to measure $\sim V_i$. A third ADC 260 may be configured to measure $\sim I_s$ and $\sim I_r$.

The first ADC 240, the second ADC 250, and the third ADC 260 may correspond to, respectively, a first ADC channel, a second ADC channel, and a third ADC channel.

A first differential amplifier 245 may be electrically connected to the first ADC 240. The first differential amplifier 245 may register voltage signals detected across the first 202 and the second 204 outer electrodes, or across the reference impedance 220, and amplify and forward these signals to the first ADC 240. The first differential amplifier 245 may be associated with a first gain. The magnitude of the first gain may thereby set a specific proportionality constant for a specific measured value. Hence $\sim V_o$ and $\sim V_r$ may be associated with similar proportionality constants if measured using a similar gain during both measurements 14, 24.

A second differential amplifier 255 may be electrically connected to the second ADC 250. The second differential amplifier 255 may register voltage signals input from the first 206 and the second 208 inner electrodes and amplify and forward these signals to the second ADC 250. The second differential amplifier 255 may be associated with a second gain. The second gain need not necessarily be equal to the first gain. The first 245 and the second 255 differential amplifier may thereby be associated with different gains during measurements. Before applying the above formula for $Z_i$ the first gain and the second gain may be equalized, i.e., so that the two quantities in the ratio have the same proportionality constant. The above may equally apply to other quantities discussed herein, such that relevant quantities in a specific ratio (e.g., the ratios included in the formulae for calculating $Z_i$ and/or $Z_T$) have similar proportionality constants. Differing proportionality constants in a specific ratio may be equalized for before or after calculating the value of the specific ratio, as readily appreciated by the skilled person.

A trans impedance amplifier, TIA, 265 may be electrically connected to the third ADC 260 to convert current originating from the electrode structure 210 or the reference impedance 220. The TIA 265 may thereby provide for measuring $\sim I_s$ and $\sim I_r$ by the third ADC 260.

Each measurement 12, 14, 16, 22, 24 may comprise recording a time series. A time series of respective measurement 12, 14, 16, 22, 24 thereby has a sinusoidal character due to the applied sinusoidal voltage signal. Hence, preferably, measured values, $\sim V_o$, $\sim V_r$, $\sim V_i$, $\sim I_s$, and $\sim I_r$, may be sampled at a frequency at least twice higher than the frequency of the applied sinusoidal voltage signal in order to record time series of measured values. A plurality of periods may be recorded for each time series. This to provide for further frequency analysis and possible noise reduction/removal (further discussed below).

Each measurement 12, 14, 16, 22, 24 may further comprise applying a discrete Fourier transform, DFT, to the recorded time series. Applying the discrete Fourier transform may comprise converting each recorded time series to a corresponding frequency spectrum. Hence, the measurement may further comprise determining a dominating frequency bin of said frequency spectrum and determining the measured value from said dominating frequency bin. Thus, a single frequency, or at least a relatively narrow frequency band corresponding to the dominating frequency bin, may be determined from the DFT analysis. In practical situations, a Fourier coefficient in connection to the measured value from the dominating frequency bin may have a magnitude being relatively large compared to any other Fourier coefficient of the remaining frequency bins. The other Fourier coefficients may be set to zero, or at least be decreased in magnitude, before transforming the (modified) frequency spectrum back to time domain. This since the recorded time series may be expected having a sinusoidal character being associated with a frequency corresponding to the determined dominating frequency. Hence, noise or other measurement artifacts may be suppressed prior to performing further analysis of respective time series.

The DFT analysis may output a plurality of values, such as ten values; magnitude and phase of each time series, such that a specific time dependent quantity A may be represented by $A=|A|e^{j(\omega t-\theta)}$, where $|A|$ is the absolute value of the amplitude of A, $\theta$ is the phase shift of A, and $\omega$ is the angular frequency of A. The single (angular) frequency under consideration, after performing the DFT analysis, may allow for a straight-forward calculation of the overall phase shift, $\theta$, in the equations above. In general, the phase shift between different recorded time series may differ among each other.

Alternatively, algorithms other than DFT may be used for frequency analysis, e.g., the Goertzel algorithm.

FIG. 2A shows a four-electrode device 200 for liquid impedance measurement. The four-electrode device 200 comprises an electrode structure 210 comprising a first outer electrode 202, a second outer electrode 204, a first inner electrode 206, and a second inner electrode 208. The four-electrode device 200 further comprises a reference impedance 210 and a signal generator 230 configured to generate a sinusoidal voltage signal.

FIG. 2B schematically shows the electrode structure 210 of the four-electrode device 200. The electrodes 202, 204, 206, 208 may be metallic and mutually substantially parallel. One pair of electrodes, i.e., the first 202 and second 204 outer electrode, is responsible for current injection, and the remaining pair, i.e., the first 206 and the second 208 inner electrode, is voltage measuring electrodes.

The four-electrode device 200, or at least the electrode structure 210 may be configured to be submerged into the liquid the impedance of which is to be measured. The four-electrode device 200 is configured to measure a value proportional to a current through said first outer electrode 202 and said second outer electrode 204, a value proportional to a voltage drop across said first outer electrode 202 and said second outer electrode 204, a value proportional to a voltage drop across a first inner electrode 206 and a second inner electrode 208 of said electrode structure 210, a value proportional to a current through said reference impedance 210, and a value proportional to a voltage drop across said reference impedance 210.

The four-electrode device 200 further comprises a processor or circuitry configured to calculate an outer impedance between said first outer electrode 202 and said second outer electrode 204 based on said reference impedance 210, said value proportional to said current through said first outer electrode 202 and said second outer electrode 204, said value proportional to said voltage drop across said first outer electrode 202 and said second outer electrode 204, said value proportional to said current through said reference impedance 210, and said value proportional to said voltage drop across said reference impedance 210. The processor or circuitry is further configured to calculate an inner impedance between said first inner electrode 206 and said second inner electrode 208 based on the calculated outer impedance, said value proportional to said voltage drop across said first outer electrode 202 and said second outer electrode 204, and said value proportional to said voltage drop across said first inner electrode 206 and said second inner electrode 208.

In particular, with reference to FIG. 2A, the four-electrode device 200 may comprise a processor 290. The processor 290 may be configured to control the circuitry components of the four-electrode device 200. In particular, the processor 290 may be configured to control, e.g., the first switch 280, the second switch 282, the third switch 284, the fourth switch 286, the first differential amplifier 245, the second differential amplifier 255, the trans impedance amplifier, TIA, 265, signal generator 230, the first analog-to-digital converter, ADC 240, the second ADC 250, and/or the third ADC 260. The processor 290 may control the respective components to carry out the disclosed method.

The processor 290, also referable to as a processing unit 290, may be implemented as a general-purpose processing unit, and/or general-purpose processor. However, the processor 290 may alternatively be implemented as firmware arranged, e.g., in an embedded system, or as a specifically designed processing unit, such as an Application-Specific Integrated Circuit (ASIC) or a Field-Programmable Gate Array (FPGA).

Further, there may be provided a computer program product comprising computer-readable instructions such that when executed on the processor 290 the computer program product will cause the processor to control the four-electrode device 200 to execute the disclosed method.

Some of the above and below disclosed features in connection with the four-electrode device 200 have already been discussed in connection with the method 100 and reference is made thereto.

The four-electrode device 200 may be implemented in a device suitable for field conditions. Hence, appropriate sealings and other weather resistant protection means may be present in such a device. The electrode structure 210 may be at least partially immersible in a liquid environment 250 for which impedance measurements are to be done. Hence, to perform impedance measurements by the four-electrode device 200, the four-electrode structure 210 is at least partially immersed in the liquid environment 250. The four electrodes 202, 204, 206, 208 thereby form three intermediate regions R1, R2, R3, wherein respective region is associated with a specific impedance. Specifically, the region R1 between the first 206 and the second 208 inner electrode is associated with $Z_i$ being the impedance of the liquid under consideration.

Further, the four-electrode device 200 may be configured to monitor ongoing measurements via wireless or wired means, thereby providing monitoring of, e.g., water quality in remote areas.

The processor or circuitry may be configured to calculate said outer impedance as representable by the equation $$Z_T = Z_r \frac{\sim I_r \sim V_o}{\sim V_r \sim I_s}$$

and calculate said inner impedance as representable by the equation $$Z_i = Z_T \frac{\sim V_i}{\sim V_o}$$

wherein $Z_T$ is said outer impedance, $Z_i$ is said inner impedance, $Z_r$ is said reference impedance 220, $\sim I_r$ is said value proportional to said current through said reference impedance 220, $\sim V_o$ is said value proportional to said voltage drop across said first outer electrode 202 and said second outer electrode 204, $\sim V_r$ is said value proportional to said voltage drop across said reference impedance 220, $\sim I_s$ is said value proportional to said current through said first outer electrode 202 and said second outer electrode 204, and $\sim V_i$ is said value proportional to said voltage drop across a first inner electrode 206 and a second inner electrode 208 of said electrode structure 210.

The respective proportionality constant may be adjusted as needed for the respective calculation, as generally known by the skilled person.

In particular, as an example $V_i$ and $V_o$ may be measured using different differential amplifiers. Hence different gains may be associated with these two quantities. Thus, before applying the above formula for $Z_i$ gains for the respective differential amplifier, as known, or, e.g., as measured during a calibration procedure, may be equalized between the two quantities, i.e., so that the two quantities in the ratio have the same proportionality constant.

The four-electrode device 200 may further comprise a first switch 280 and a second switch 282 configured to, upon said sinusoidal voltage signal being generated, switch a path through which said sinusoidal voltage signal is traversable between across said electrode structure 210 and across said reference impedance 220. That is, when the first switch 280 and the second switch 282 both are in position A measurements across the electrode structure 210 may be performed, and when the first switch 280 and the second switch 282 is in position B measurements across the reference impedance 220 may be performed.

The signal generator 230 may comprise a digital-to-analog converter, DAC.

The four-electrode device 200 may comprise a first analog-to-digital converter, ADC, 240 a second ADC, 250 and a third ADC 260. The first ADC 240 may be configured to measure $\sim V_o$ and $\sim V_r$. The second ADC 250 may be configured to measure $\sim V_i$. The third ADC 260 may be configured to measure $\sim I_s$ and $\sim I_r$.

The first ADC 240, the second ADC 250, and the third ADC 260 may correspond to, respectively, a first ADC channel, a second ADC channel, and a third ADC channel.

The four-electrode device 200 may further comprise a third switch 284 and a fourth switch 286 arranged to selectively connect said first ADC 240. Connection of the first ADC 240 is thereby established upon the third 284 and the fourth 286 switch being in position C.

The processor or circuitry may further be configured to record a time series pertaining to each of $\sim V_o$, $\sim V_r$, $\sim V_i$, $\sim I_s$, and $\sim I_r$.

The processor or circuitry may further be configured to apply a discrete Fourier transform, DFT, to each recorded time series.

In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. A method for liquid impedance measurement using a four-electrode device comprising an electrode structure, the method comprising:
    applying a sinusoidal voltage signal across a first outer electrode and a second outer electrode of said electrode structure and performing a first set of measurements comprising:
        measuring a value proportional to a current through said first outer electrode and said second outer electrode;
        measuring a value proportional to a voltage drop across said first outer electrode and said second outer electrode;
        measuring a value proportional to a voltage drop across a first inner electrode and a second inner electrode of said electrode structure;
    applying said sinusoidal voltage signal across a reference impedance and performing a second set of measurements comprising:
        measuring a value proportional to a current through said reference impedance;
        measuring a value proportional to a voltage drop across said reference impedance;
    calculating an outer impedance between said first outer electrode and said second outer electrode based on:
        said reference impedance,
        said value proportional to said current through said first outer electrode and said second outer electrode,
        said value proportional to said voltage drop across said first outer electrode and said second outer electrode,
        said value proportional to said current through said reference impedance, and
        said value proportional to said voltage drop across said reference impedance; and
    calculating an inner impedance between said first inner electrode and said second inner electrode based on:
        the calculated outer impedance,
        said value proportional to said voltage drop across said first outer electrode and said second outer electrode, and
        said value proportional to said voltage drop across said first inner electrode and said second inner electrode.

2. The method according to claim 1, wherein said calculating of said outer impedance is representable as:

$$Z_T = Z_r \frac{\sim I_r \sim V_o}{\sim V_r \sim I_s}$$

and said calculating of said inner impedance is representable as:

$$Z_i = Z_T \frac{\sim V_i}{\sim V_o}$$

wherein
$Z_T$ is said outer impedance,
$Z_i$ is said inner impedance,
$Z_r$ is said reference impedance,
$\sim I_r$ is said value proportional to said current through said reference impedance,
$\sim V_o$ is said value proportional to said voltage drop across said first outer electrode and said second outer electrode,
$\sim V_r$ is said value proportional to said voltage drop across said reference impedance,
$\sim I_s$ is said value proportional to said current through said first outer electrode and said second outer electrode, and
$\sim V_i$ is said value proportional to said voltage drop across said first inner electrode and said second inner electrode of said electrode structure.

3. The method according to claim 1, wherein each said applying of said sinusoidal voltage signal comprises applying said sinusoidal voltage signal by a digital-to-analog converter, DAC.

4. The method according to claim 1, wherein each said measuring comprises a conversion by an analog-to-digital converter, ADC.

5. The method according to claim 1, wherein each said measuring comprises recording a time series.

6. The method according to claim 5, wherein each said measuring further comprises applying a discrete Fourier transform, DFT, to the recorded time series.

7. The method according to claim 6, wherein said applying of said discrete Fourier transform comprises converting each recorded time series to a corresponding frequency spectrum and said measuring further comprises:
determining a dominating frequency bin of said frequency spectrum, and
determining the measured value from said dominating frequency bin.

8. A computer program product comprising computer-readable instructions such that when executed on a processor the computer program product will cause the processor to execute the method of claim 1.

9. A four-electrode device for liquid impedance measurement, said four-electrode device comprising:
an electrode structure comprising:
a first outer electrode;
a second outer electrode;
a first inner electrode; and
a second inner electrode;
a reference impedance; and
a signal generator configured to generate a sinusoidal voltage signal, wherein said four-electrode device is configured to measure:
a value proportional to a current through said first outer electrode and said second outer electrode;
a value proportional to a voltage drop across said first outer electrode and said second outer electrode;
a value proportional to a voltage drop across a first inner electrode and a second inner electrode of said electrode structure;
a value proportional to a current through said reference impedance; and
a value proportional to a voltage drop across said reference impedance, and wherein the four-electrode device further comprises:
a processor or circuitry configured to calculate:
an outer impedance between said first outer electrode and said second outer electrode based on:
said reference impedance,
said value proportional to said current through said first outer electrode and said second outer electrode,
said value proportional to said voltage drop across said first outer electrode and said second outer electrode,
said value proportional to said current through said reference impedance, and
said value proportional to said voltage drop across said reference impedance; and
an inner impedance between said first inner electrode and said second inner electrode based on:
the calculated outer impedance,
said value proportional to said voltage drop across said first outer electrode and said second outer electrode, and
said value proportional to said voltage drop across said first inner electrode and said second inner electrode.

10. The four-electrode device according to claim 9, wherein said processor or circuitry is configured to calculate said outer impedance as representable by $$Z_T = Z_r \frac{\sim I_r \sim V_o}{\sim V_r \sim I_s}$$

and calculate said inner impedance as representable by $$Z_i = Z_T \frac{\sim V_i}{\sim V_o}$$

wherein
$Z_T$ is said outer impedance,
$Z_i$ is said inner impedance,
$Z_r$ is said reference impedance,
$\sim I_r$ is said value proportional to said current through said reference impedance,
$\sim V_o$ is said value proportional to said voltage drop across said first outer electrode and said second outer electrode,
$\sim V_r$ is said value proportional to said voltage drop across said reference impedance,
$\sim I_s$ is said value proportional to said current through said first outer electrode and said second outer electrode, and
$\sim V_i$ is said value proportional to said voltage drop across a first inner electrode and a second inner electrode of said electrode structure.

11. The four-electrode device according to claim 9, further comprising:
a first switch and a second switch configured to, upon said sinusoidal voltage signal being generated, switch a path, through which said sinusoidal voltage signal is traversable, between across said electrode structure and across said reference impedance.

12. The four-electrode device according to claim 9, wherein said signal generator comprises a digital-to-analog converter, DAC.

13. The four-electrode device according to claim 9, further comprising:
- a first analog-to-digital converter, ADC, configured to measure
  - said value proportional to said voltage drop across said first outer electrode and said second outer electrode, and
  - said value proportional to said voltage drop across said reference impedance;
- a second ADC configured to measure
  - said value proportional to said voltage drop across said first inner electrode and said second inner electrode; and
- a third ADC configured to measure
  - said value proportional to said current through said first outer electrode and said second outer electrode, and
  - said value proportional to said current through said reference impedance.

14. The four-electrode device according to claim 13, further comprising:
- a third switch and a fourth switch arranged to selectively connect said first ADC.

15. The four-electrode device according to claim 9, wherein said processor or circuitry is further configured to record a time series pertaining to each of
- said value proportional to said voltage drop across said first outer electrode and the second outer electrode,
- said value proportional to said voltage drop across said reference impedance,
- said value proportional to said voltage drop across said first inner electrode and said second inner electrode,
- said value proportional to said current through said first outer electrode and said second outer electrode, and
- said value proportional to said current through said reference impedance.

16. The four-electrode device according to claim 15, wherein said processor or circuitry is further configured to apply a discrete Fourier transform, DFT, to each recorded time series.

* * * * *